(12) United States Patent
Kurabayashi

(10) Patent No.: US 6,896,640 B2
(45) Date of Patent: May 24, 2005

(54) SHIFT CONTROL APPARATUS FOR TRANSMISSION

(75) Inventor: Masahiko Kurabayashi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/308,997

(22) Filed: Dec. 4, 2002

(65) Prior Publication Data

US 2003/0104903 A1 Jun. 5, 2003

(30) Foreign Application Priority Data

Dec. 5, 2001 (JP) .................................. P. 2001-371106

(51) Int. Cl.$^7$ .............................................. B60K 41/12
(52) U.S. Cl. ........................... 477/46; 477/97; 477/901; 477/904
(58) Field of Search ............................ 477/44, 46, 97, 477/901, 904; 701/65

(56) References Cited

U.S. PATENT DOCUMENTS

| | | | | |
|---|---|---|---|---|
| 4,566,354 A | * | 1/1986 | Kumura et al. | 477/46 |
| 4,671,138 A | * | 6/1987 | Nobumoto et al. | 477/46 |
| 5,669,847 A | * | 9/1997 | Kashiwabara | 477/46 |
| 5,730,680 A | * | 3/1998 | Toukura | 477/46 |
| 6,029,107 A | | 2/2000 | Sato | |
| 6,671,601 B2 | * | 12/2003 | Abiru | 477/43 |
| 2001/0053731 A1 | * | 12/2001 | Ibamoto et al. | 477/46 |

FOREIGN PATENT DOCUMENTS

| | | |
|---|---|---|
| DE | 198 56 732 A 1 | 6/2000 |
| EP | 0 635 659 A2 | 7/1994 |
| JP | 11-182665 | 7/1999 |

* cited by examiner

*Primary Examiner*—Dirk Wright
(74) *Attorney, Agent, or Firm*—McGinn & Gibb, PLLC

(57) ABSTRACT

A shift control apparatus of a transmission for a vehicle having an input shaft driven by an engine and an output shaft connecting with a drive wheel for automatically changing a speed ratio between the input shaft and the output shaft, comprises accelerator pedal operating amount detecting means for detecting an operating amount of an accelerator pedal, road gradient detecting means for detecting a gradient of a road on which the vehicle travels, vehicle speed detecting means for detecting a vehicle speed, kick-down mode establishing means for establishing a kick-down mode when the operating amount of the accelerator pedal exceeds a threshold value and control means for changing the threshold value based on the road gradient and the vehicle speed.

26 Claims, 5 Drawing Sheets

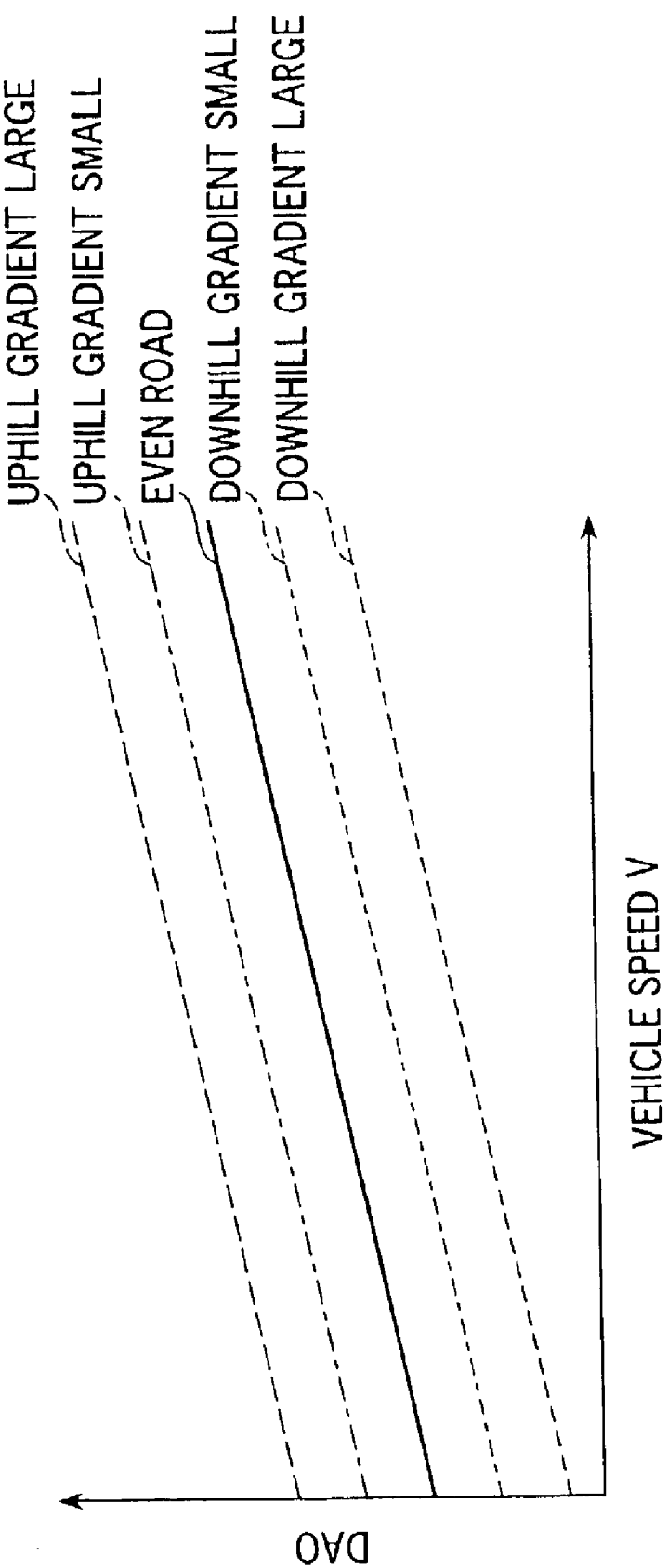

SHIFT CONTROL APPARATUS FOR TRANSMISSION

BACKGROUND OF THE INVENTION

1. Field of the Invention

The present invention relates to a shift control apparatus for a transmission and more particularly to the shift control apparatus in which, when a vehicle travels on grades, a kick-down can be established at the same timing as traveling on an even road.

2. Discussion of Related Arts

In automatic transmissions, there are a continuously variable transmission (CVT) in which speed reduction ratios are changed continuously and a gear type automatic transmission in which gear ratios are changed through gear trains. In the continuously variable transmission, there are a belt drive type in which speed reduction ratios are changed by two variable groove width pulleys and a belt or chain winding around the pulleys and a troydal type in which speed ratios are changed by two discs and two power rollers.

On the other hand, in the gear type automatic transmission, there are a planetary type in which a plurality of gear trains composed of planetary gears are changed on one shaft and a parallel shafts type in which a plurality of gear trains provided between two or more shafts are changed by changeover mechanisms.

As disclosed in Japanese Patent Application Laid-open No. Toku-Kai-Hei 11-182665, thus automatically controlled speed ratios or gear ratios are obtained by referring to a shift schedule chart parameterizing vehicle speeds, throttle opening angles and the like and stored in a memory of a control unit. Thus, in case of a continuously variable transmission, optimum speed ratios are selected based on vehicle speeds, throttle opening angles and the like and stepless (continuous) shiftings are accomplished from a low speed up to an overdrive. Further, in case of a gear type automatic transmission, optimum gear positions are selected based on vehicle speeds, throttle opening angles and the like and a stepwise shifting is performed also from a low speed up to an overdrive.

This shift schedule chart is mostly established based on experiments and the like so as to be optimum under general traveling conditions. Hence, in case where a sharp acceleration is needed when passing, transmissions having a kick-down mode in which speed ratios or gear ratios rapidly increase or the gear position is shifted down so as to enable a sharp acceleration have been developed.

Further, some transmission can automatically establish a kick-down mode automatically based on an operating amount of an accelerator pedal determined by vehicle speeds.

However, in case where a vehicle enters a traveling on grades from a traveling on flat grounds, an accelerator pedal must be operated according to a gradient of road in order to maintain vehicle speeds.

Accordingly, when the operating amount of the accelerator pedal varies according to road gradients, some transmission having a kick-down mode operative based on the operating amount of the accelerator pedal enters the kick-down mode irrespective of an intention of a driver and as a result the driver feels uncomfortable.

SUMMARY OF THE INVENTION

It is an object of the present invention to provide a shift control apparatus of a transmission in which a kick-down is established at a timing according to an intention of a driver under traveling conditions with changing gradients.

In order to attain the object, a shift control apparatus of an automatic transmission comprises accelerator pedal operating amount detecting means for detecting an operating amount of an accelerator pedal, road gradient detecting means for detecting a gradient of a road on which the vehicle travels, vehicle speed detecting means for detecting a vehicle speed, kick-down mode establishing means for establishing a kick-down mode when the operating amount of the accelerator pedal exceeds a threshold value and control means for changing the threshold value based on the road gradient and the vehicle speed.

BRIEF DESCRIPTION OF DRAWINGS

FIG. 5 is a graph showing an operating amount of an accelerator pedal

DESCRIPTION OF THE PREFERRED EMBODIMENT

Figure 1:
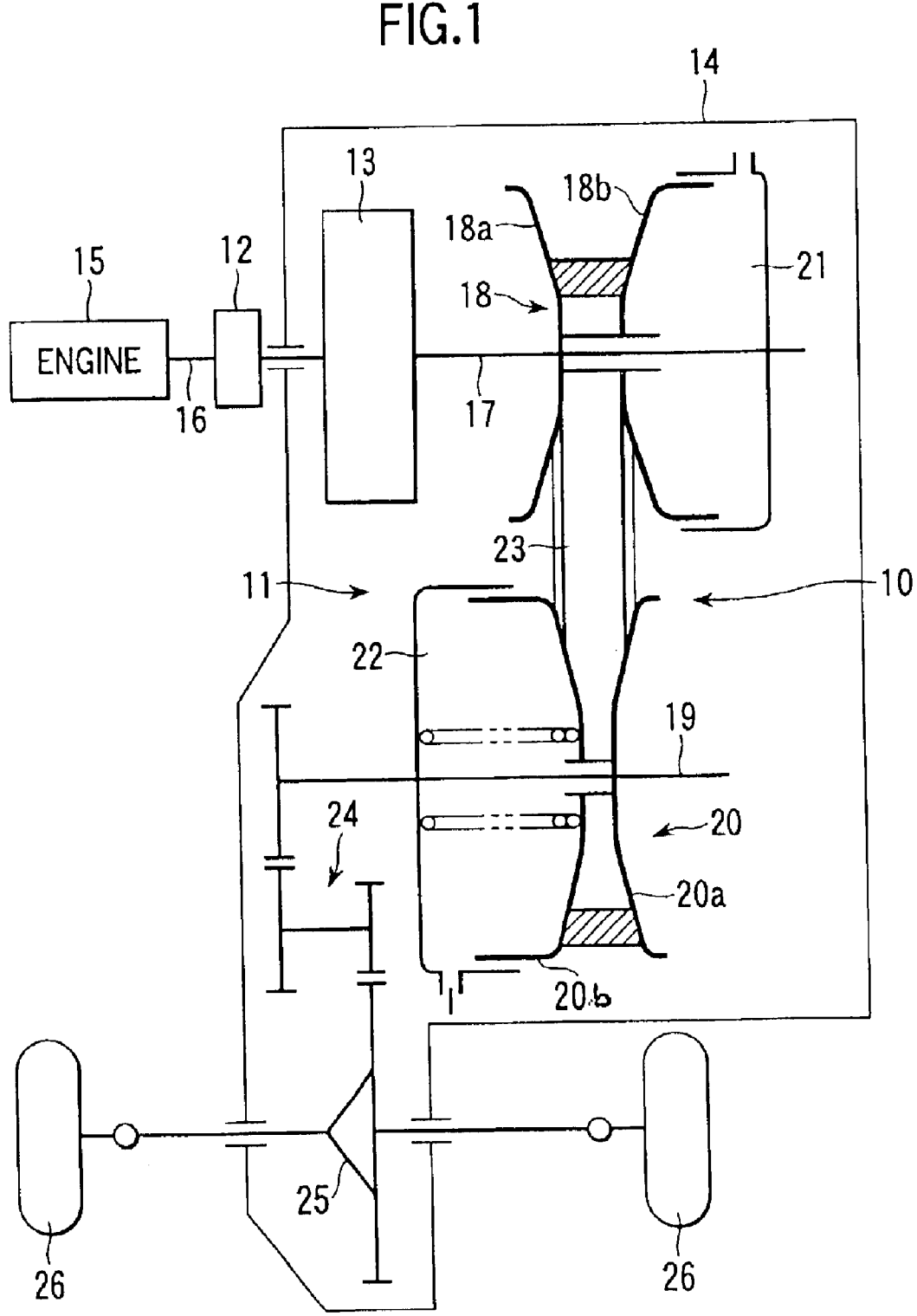
FIG. 1 is a schematic view showing a power transmission system including a transmission.

Referring now to FIG. 1, reference numeral 10 denotes a continuously variable transmission and reference numeral 11 denotes a power transmission system. The power transmission system 11 comprises a start clutch 12 constituted by a torque converter and the like, a forward and reverse changeover apparatus 13 for changing over the direction of rotation of power by a planetary gear and the like and the continuously variable transmission 10 for continuously changing speeds and the overall power transmission system 11 is accommodated in a case 14.

A crankshaft 16 of an engine 15 is connected with the start clutch 12 and the start clutch 12 is connected with the forward and reverse changeover apparatus 13. Further, a fixed sheave 18a of a primary pulley 18 is secured to an input shaft 17 connected with the forward and reverse changeover apparatus 13 and a movable sheave 18b of the primary pulley 18 is slidably mounted opposite to the fixed sheave 18a on the input shaft 17 through a ball spline. Further, a fixed sheave 20a of a secondary pulley 20 is secured to an output shaft 19 arranged in parallel with the input shaft 17 and a movable sheave 20b of the secondary pulley 20 is slidably mounted opposite to the fixed sheave 20a on the output shaft 19 through a ball spline.

The primary pulley 18 has a primary pressure chamber 21 for sliding the movable sheave 18b in an axial direction by supplying hydraulic pressure to the pressure chamber 21 and the secondary pulley 20 has a secondary pressure chamber 22 for sliding the movable sheave 20b in an axial direction by supplying hydraulic pressure to the secondary pressure chamber 22. Further, a drive belt 23 is looped over the primary pulley 18 and the secondary pulley 20. Respective pulley diameters of the primary pulley 18 and the secondary pulley 20 are changed by sliding the movable sheaves 18b, 20b to change a groove width of the respective pulleys 18, 20. Thus, a pulley ratio between the input shaft 17 and the output shaft 19 varies continuously and a continuous variable transmission is formed.

The output shaft 19 is connected with drive wheels 26, 26 through a reduction gear train 24 and a differential 25. The rotational direction of driving force is changed to forward or reverse by the forward and reverse changeover apparatus 13.

Figure 2:
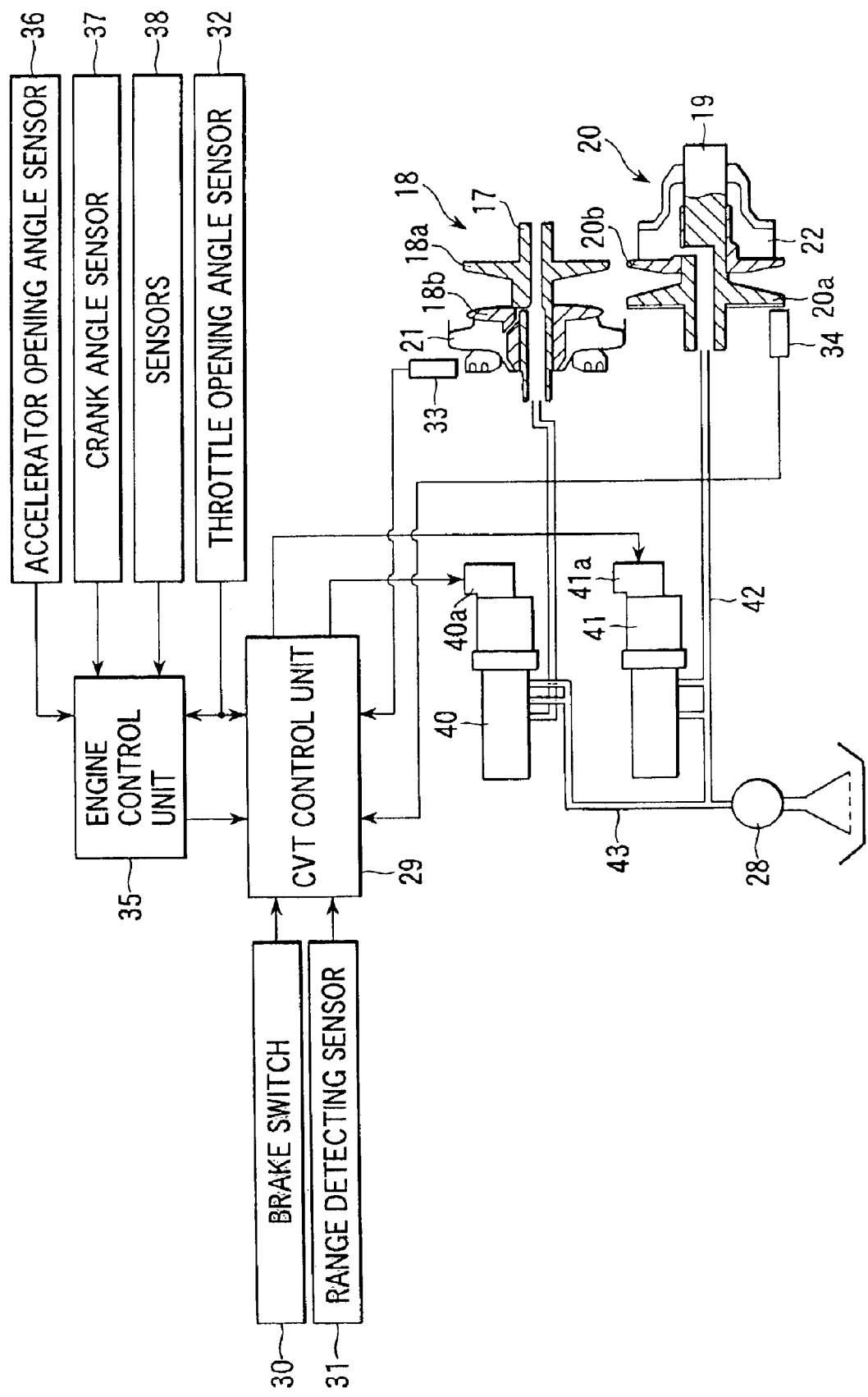
FIG. 2 is a schematic view showing a shift control apparatus of a transmission according to an embodiment of the present invention.

Referring to FIG. 2, regulated working fluid is fed to the primary pressure chamber 21 as a primary pressure from an oil pump 28 to change the groove width of the primary pulley 18. Further, similarly, regulated working fluid is supplied to the secondary pressure chamber 22 as a secondary pressure to give a friction force needed for torque transmission to the drive belt 23. These regulated hydraulic pressures are established according to signals based on traveling conditions of a vehicle from a CVT control unit 29.

The control unit 29 is mainly composed of a microcomputer. As shown in FIG. 2, an input port of the CVT control unit 29 is connected with a brake switch 30 for outputting a signal when a brake pedal is depressed, a range detecting sensor 31 for detecting a selected selector range, a throttle opening angle sensor 32 for detecting an opening angle of a throttle valve, a primary pulley speed sensor 33 for detecting a revolution speed of the primary pulley 18, a secondary pulley speed sensor 34 for detecting a revolution speed of the secondary pulley 20 and an engine control unit 35. An accelerator pedal operating amount (accelerator pedal depression amount) Ao calculated from an output signal of an accelerator pedal opening angle sensor 36, an engine speed Ne calculated from an output signal of a crank angle sensor 37 and miscellaneous calculation information calculated from an output signal of miscellaneous sensors 38, are outputted from the engine control unit 35.

An output port of the CVT control unit 29 is connected with a proportional solenoid 40a of a shift control valve 40 for regulating the primary hydraulic pressure and is connected with a proportional solenoid 41a of a line pressure control valve 41 for regulating the secondary hydraulic pressure.

The accelerator pedal opening angle sensor 36 is attached to an accelerator pedal (not shown) and sends a depression amount of the accelerator pedal by a vehicle driver as an electric signal indicative of an operating amount Ao of the accelerator pedal to the engine control unit 35. A throttle valve (not shown) is driven according to the operating amount Ao of the accelerator pedal. Next, a throttle valve opening amount To detected by the throttle valve opening angle sensor 32 is inputted to the engine control unit 35 wherein a feedback control is performed. The throttle valve opening amount To is inputted to the CVT control unit 29 and is used for the shift control of the continuously variable transmission 10 therein. Thus, the accelerator pedal operating amount Ao has a correlation with the throttle valve opening amount To and both amounts represent an intention of acceleration by the driver.

Further, as shown in FIG. 2, a line pressure control valve 41 is connected with an oil passage 42 connecting the oil pump 28 and the secondary pressure chamber 22 and working fluid regulated by the line pressure control valve 41 at a specified line pressure is fed as a secondary pressure to the secondary pressure chamber 22. Further, a shift control valve 40 is connected with an oil passage 43 branching from the oil passage 42 and communicating with the primary pressure chamber 21 to supply a primary pressure regulated from the line pressure to the primary pressure 21.

Below, the shift control by the CVT control unit 29 will be described.

The CVT control unit 29 controls an operating amount (displacement) of the proportional solenoid 40a attached to the shift control valve 40 and operates as follows to change the groove width of the pulleys 18, 20.

Figure 3:
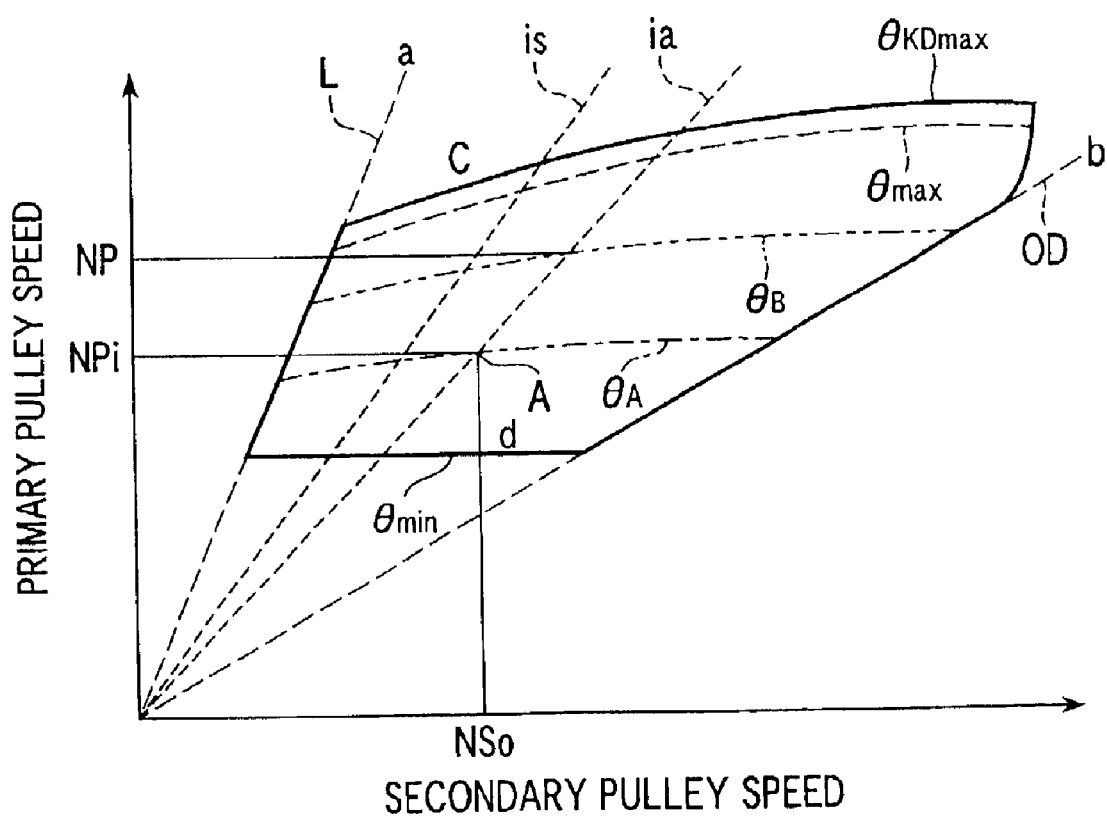
FIG. 3 is a diagram showing a shift schedule parameterizing primary pulley speeds and secondary pulley speeds of the transmission.

FIG. 3 is a shift schedule chart showing a shift characteristic during traveling. In the drawing, a maximum speed ratio L is expressed in a broken line a and a minimum speed ratio OD is expressed in a broken line b. A shift characteristic line $\theta_{kdmax}$ when the throttle valve is fully open in a kick-down mode is expressed in a solid line c and a shift characteristic line $\theta_{min}$ when the throttle valve is fully closed is expressed in a solid line d. The speed ratio is established within an area enclosed by solid lines.

The shift schedule chart shown in FIG. 3 is stored in a memory of the CVT control unit 29. A target speed ratio $i_s$ is calculated as follows. First, when the accelerator pedal is depressed by the vehicle driver from a point A, that is, a traveling condition of a throttle opening angle corresponding to a shift characteristic line $\theta_A$ to a traveling condition of a throttle opening angle corresponding to a shift characteristic line $\theta_B$, an actual speed ratio $i_a$ at this moment is calculated from the speeds Npi, Nso of two pulleys 18, 20 and a target primary pulley speed NP is calculated from the actual speed ratio $i_a$ and the shift characteristic line $\theta_B$.

Next, based on a ratio of the target primary pulley speed NP to the actual secondary pulley speed Nso, the target speed ratio $i_s$ is calculated and a solenoid current is established to converge the actual speed ratio $i_a$ to the target speed ratio $i_s$. When the solenoid current is fed to the proportional solenoid 40a of the shift control valve 40, the primary pressure is regulated by the shift control valve 40 to slide the movable sheave 18b of the primary pulley 18 in an axial direction. As a result, the actual primary pulley speed NPi is controlled so as to converge to the target primary pulley speed NP. The target speed ratio $i_s$ is newly established every specified time and the shift operation continues.

In a regular traveling mode, the target primary pulley speed NP is established and the target speed ratio $i_s$ is established within a range of the shift characteristic line $\theta_{max}$ shown in FIG. 3. On the other hand, in a kick-down mode, since an upper limit of the target primary pulley speed can be raised up to the shift characteristic line $\theta_{Kdmax}$, the target speed ratio $i_s$ at shifting is established to a large value and an upper limit of the target primary pulley speed NP, namely, an upper limit of the engine speed Ne is raised. As a result, a sharp acceleration can be realized compared to the normal traveling mode.

The kick-down mode is established by a control means incorporated in the CVT control unit 29. Below, a kick-down process including an establishment of the kick-down mode and its canceling will be described. The kick-down process is executed every specified time, for example 10 milliseconds.

Figure 4:
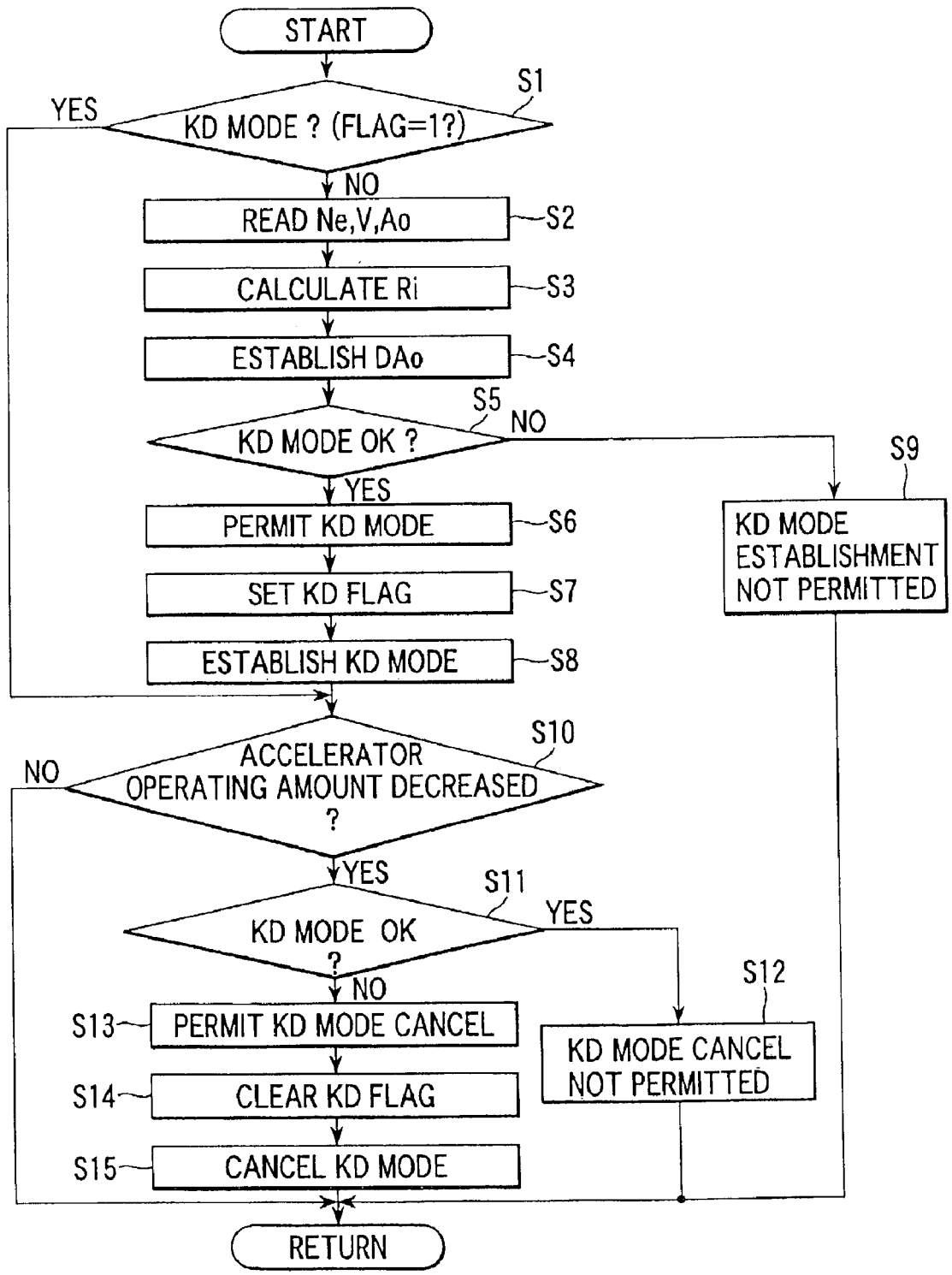
FIG. 4 is a flowchart showing processes of a kick-down mode according to the embodiment of the present invention.

FIG. 4 is a flowchart showing steps of processing the kick-down mode. As shown in FIG. 4, at a step S1, it is judged whether or not the present traveling mode is a kick-down mode by referring to a flag. When the present mode is not a kick-down mode, that is, when it is a regular traveling mode, the program goes to steps after S2 in which the kick-down mode is established. On the other hand, when the present mode is a kick-down mode, the program goes to step after S10 in which the kick-down mode is canceled.

At a step S2, the control means reads an accelerator pedal operating amount Ao calculated from an output signal of the accelerator pedal opening angle sensor 36, a vehicle speed V calculated from an output signal of a vehicle speed detecting means provided in the CVT control unit 29 and an engine speed Ne calculated from an output signal of the crank angle sensor 37. The vehicle speed V calculated by employing an actual secondary pulley speed Nso calculated from an output signal of the secondary pulley speed sensor 34, a reduction gear ratio of the reduction gear train 24 and the differential 25 and a radius r of the drive wheel 26.

At a step S3, a road gradient Ri of a road on which the vehicle travels is obtained from a gradient detecting means incorporated in the CVT control unit 29. The road gradient Ri is obtained by reference to a table parameterizing an increment $\Delta R$ of the running resistance, a throttle valve opening angle To, a vehicle speed V and the like. The table may parameterizes an accelerator pedal operating amount Ao in place of the throttle valve opening angle To. The increment $\Delta R$ of the running resistance is calculated from the following formula:

$$\Delta R = Fo - Ra - Rr - Rh$$

where Fo is driving force of the drive wheel 26, Ra is air resistance, Rr is rolling resistance, and Rh is acceleration resistance. The sum of respective resistances Ra, Rr and Rh is a running resistance R.

Further, Fo is obtained from the following formula:

$$Fo = Te \cdot Gear / r$$

where Te is an engine torque, Gear is a total reduction gear ratio, and r is a radius of the drive wheel 26. Further, Gear is obtained from the formula $Gear = i_a \cdot i_r$. In the formula, $i_a$ is an actual speed ratio ($i_a = Npi/Nso$) of the continuously variable transmission 10. $i_r$ is a constant indicative of a reduction gear ratio of the reduction gear train 24 and differential 25. Further, the engine torque Te is obtained with interporation by referring to a table parameterizing engine speed Ne and throttle valve opening amount To. The table is stored in a memory of the CVT control unit 29.

In this embodiment, the air resistance Ra is calculated based on an air resistance coefficient and the vehicle speed V. The rolling resistance Rr is given as a constant on the basis of running on pavement. The acceleration resistance Rh is given as a sum of a vehicle acceleration resistance obtained from the vehicle speed V and a rotation resistance calculated based on an inertia moment of power transmission system and an angular acceleration.

At a step S4, an accelerator pedal operating amount for judging the kick-down, that is, a kick-down threshold value DAo of the accelerator pedal depression amount, is established based on the vehicle speed V which is read at the step S2 and the road gradient Ri calculated at the step S3. The kick-down threshold value DAo is obtained by reference to a table stored in a memory of the CVT control unit 29. An example of the kick-down threshold value DAo is shown in FIG. 5. As shown in the drawing, the kick-down threshold value DAo is established such that as the road gradient increases from an even road, the accelerator pedal operating amount Ao for establishing the kick-down mode becomes large. On the other hand, the kick-down threshold value DAo is established such that as the road gradient decreases from an even road, the accelerator operating amount Ao for establishing the kick-down mode becomes small.

Next, at a step S5, it is judged whether or not the kick-down mode is permitted to be established by comparing the accelerator pedal operating amount Ao with the kick-down threshold value DAo. If a vehicle driver depresses the accelerator pedal by more than the threshold value DAo, the program goes to a step S6 where the kick-down mode is permitted to be established. Then, at a step S7 a kick-down continuation flag is set and at a step S8 the kick-down mode is established. On the other hand, the depression amount of the accelerator pedal of the driver is less than the threshold value DAo, the program goes to a step S9 where the kick-down mode is not permitted and the program returns to START.

When it is judged at the step S1 that the kick-down mode has been set, or when the flag is newly set at the step S7, it is judged at the steps after a step S10 whether or not the kick-down mode is canceled.

At the step S10, it is judged whether or not the present accelerator pedal operating amount Ao decreases compared to the previous accelerator pedal operating amount Ao. In case where it is judged that there is no reduction in the accelerator pedal operating amount Ao, the process of canceling the kick-down mode finishes. On the other hand, in case where it is judged that the accelerator pedal operating amount Ao decreases, the program goes to a step S11.

At the step S11, it is judged in the same way as in the step S5 whether or not the kick-down mode is permitted to be established by comparing the accelerator pedal operating amount Ao with the threshold value DAo. If the driver depresses the accelerator pedal by more than the kick-down threshold value DAo, the program goes to a step S12 where the kick-down mode is not permitted to be canceled and returns to START with the kick-down mode retained.

On the other hand, if the depression amount of the accelerator pedal by the driver is smaller than the threshold value DAo, the program goes to a step S13 where the kick-down mode is permitted to be canceled. Then, at a step S14 the continuation flag is canceled and at a step S15 the kick-down mode is canceled and the transmission control returns to the regular running mode.

In summary, since the kick-down threshold value DAo of the accelerator operating amount Ao for establishing the kick-down mode is determined according to the road gradient Ri, when the vehicle travels on an upgrade at the same speed as on an even road with an increased accelerator operating amount Ao, the threshold value DAo is raised and as a result the kick-down mode can be established according to the intention of the vehicle driver.

The entire contents of Japanese Patent Application No. Tokugan 2001-371106 filed Dec. 5, 2001, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A shift control apparatus of a transmission for vehicle having an input shaft driven by an engine and an output shaft connecting with a drive wheel for automatically changing a speed ratio between said input shaft and said output shaft, comprising:

accelerator pedal depression amount detecting means for detecting a depression amount of an accelerator pedal;

road gradient detecting means for detecting a gradient of a road on which said vehicle travels;

kick-down mode establishing means for establishing a kick-down mode when said depression amount of said accelerator pedal exceeds a threshold value; and control means for changing said threshold value at least based on said road gradient;

wherein said threshold value comprises a high value when said vehicle travels on an upgrade, compared to when said vehicle travels on an even road.

2. A shift control apparatus of a transmission for vehicle having an input shaft driven by an engine and an output shaft connecting with a drive wheel for automatically changing a speed ratio between said input shaft and said output shaft, comprising:

accelerator pedal depression amount detecting means for detecting a depression amount of an accelerator pedal;

road gradient detecting means for detecting a gradient of a road on which said vehicle travels;

kick-down mode establishing means for establishing a kick-down mode when said depression amount of said accelerator pedal exceeds a threshold value; and control means for changing said threshold value at least based on said road gradient, wherein said threshold value comprises a small value when said vehicle travels on a downgrade, compared to when said vehicle travels on an even road.

3. A shift control apparatus of a transmission for a vehicle having an input shaft driven by an engine and an output shaft connecting with a drive wheel for automatically changing a speed ratio between said input shaft and said output shaft, comprising:

an accelerator pedal sensor for detecting a depression amount of an accelerator pedal;

a road gradient module for detecting a gradient of a road on which said vehicle travels;

a vehicle speed detector for detecting a vehicle speed;

a kick-down mode module for establishing a kick-down mode when said depression amount of said accelerator pedal exceeds a threshold value; and a controller for changing said threshold value based on said road gradient and said vehicle speed, wherein said threshold value comprises a high value when said vehicle travels on an upgrade, compared to when said vehicle travels on an even road.

4. A shift control apparatus of a transmission for vehicle having an input shaft driven by an engine and an output shaft connecting with a drive wheel for automatically changing a speed ratio between said input shaft and said output shaft, comprising:

an accelerator pedal sensor for detecting a depression amount of an accelerator pedal;

a road gradient module for detecting a gradient of a road on which said vehicle travels;

a vehicle speed detector for detecting a vehicle speed;

a kick-down mode module for establishing a kick-down mode when said depression amount of said accelerator pedal exceeds a threshold value; and a controller for changing said threshold value based on said road gradient and said vehicle speed, wherein said threshold value comprises a small value when said vehicle travels on a downgrade, compared to when said vehicle travels on an even road.

5. A shift control apparatus of a transmission for vehicle for automatically changing a speed ratio of the transmission, comprising:

an accelerator pedal sensor for detecting a depression amount of an accelerator pedal;

a road gradient sensor for detecting a gradient of a road on which said vehicle travels;

a kick-down module for establishing a kick-down mode when said depression amount of said accelerator pedal exceeds a threshold value; and a controller for changing said threshold value at least based on said road gradient;

wherein said threshold value comprises a high value when said vehicle travels on an upgrade, compared to when said vehicle travels on an even road.

6. The apparatus according to claim 5, wherein said accelerator pedal sensor comprises a sensor attached to said accelerator pedal.

7. The apparatus according to claim 5, wherein said kick-down module determines whether a present traveling mode of said vehicle comprises kick-down mode.

8. The apparatus according to claim 5, wherein said kick-down module determines whether said present traveling mode comprises said kick-down mode by:

reading an accelerator pedal operating amount calculated from an output signal of said accelerator pedal sensor, a vehicle speed and an engine speed;

obtaining said gradient from said road gradient sensor;

calculating said threshold value based on said vehicle speed and said gradient;

comparing said accelerator pedal depression amount with said threshold value to determine if said kick-down mode is permitted.

9. The apparatus according to claim 7, wherein said kick-down module determines whether said present traveling mode could be kick-down mode by:

determining whether said kick-down mode is permitted to be canceled by determining if said accelerator pedal depression amount decreases compared to a previous accelerator pedal depression amount; and canceling said kick-down mode.

10. The apparatus according to claim 8, further comprising:

determining whether said kick-down mode is permitted to be canceled by determining if said accelerator pedal depression amount decreases compared to a previous accelerator pedal depression amount; and canceling said kick-down mode.

11. The apparatus according to claim 8, further comprising:

a crank angle sensor for detecting said engine speed.

12. The apparatus according to claim 8, further comprising:

a vehicle speed detector for detecting said vehicle speed.

13. A shift control apparatus of a transmission for a vehicle for automatically changing a speed ratio of the transmission comprising:

an accelerator pedal sensor for detecting a depression amount of an accelerator pedal;

a road gradient sensor for detecting a gradient of a road on which said vehicle travels;

a kick-down module for establishing a kick-down mode when said depression amount of said accelerator pedal exceeds a threshold value; and a controller for changing said threshold value at least based on said road gradient;

wherein said threshold value comprises a small value when said vehicle travels on a downgrade, compared to when said vehicle travels on an even road.

14. The apparatus according to claim 13, wherein said accelerator pedal sensor comprises a sensor attached to said accelerator pedal.

15. The apparatus according to claim 13, wherein said kick-down module determines whether a present traveling mode of said vehicle comprises a kick-down mode.

16. The apparatus according to claim 15, wherein said kick-down module determines whether said present traveling mode comprises said kick-down mode by:

reading an accelerator pedal operating amount calculated from an output signal of said accelerator pedal sensor, a vehicle speed and an engine speed;

obtaining said gradient from said road gradient sensor;

calculating said threshold value based on said vehicle speed and said gradient;

comparing said accelerator pedal depression amount with said threshold value to determine if said kick-down mode is permitted.

17. The apparatus according to claim 15, wherein said kick-down module determines whether said present traveling mode comprises said kick-down mode by:

determining whether said kick-down mode is permitted to be canceled by determining if said accelerator pedal depression amount decreases compared to a previous accelerator pedal depression amount; and canceling said kick-down mode.

18. The apparatus according to claim 16, further comprising:

determining whether said kick-down mode is permitted to be canceled by determining if said accelerator pedal depression amount decreases compared to a previous accelerator pedal depression amount; and canceling said kick-down mode.

19. The apparatus according to claim 16, further comprising:

a crank angle sensor for detecting said engine speed.

20. The apparatus according to claim 16, further comprising:

a vehicle speed detector for detecting said vehicle speed.

21. A method of controlling a kick-down mode, comprising:

sensing an amount of road gradient;

calculating a kick-down mode threshold based on said road gradient; and establishing a kick-down mode when an amount of an accelerator pedal depression exceeds said threshold value, wherein said kick-down mode threshold comprises a high value when a vehicle travels on an upgrade, compared to when said vehicle travels on an even road.

22. A method of controlling a kick-down mode, comprising:

sensing an amount of road gradient;

calculating a kick-down mode threshold based on said road gradient; and establishing a kick-down mode when an amount of an accelerator pedal depression exceeds said threshold value, wherein said kick-down mode threshold comprises a small value when a vehicle travels on a downgrade, compared to when said vehicle travels on an even road.

23. The method of claim 21, further comprising:

sensing said amount of an accelerator pedal depression; and comparing said amount of accelerator pedal depression with said kick-down mode threshold.

24. The method of claim 22, further comprising:

sensing said amount of an accelerator pedal depression; and comparing said amount of accelerator pedal depression with said kick-down mode threshold.

25. An apparatus for controlling shifting for transmission, comprising:

a gradient module that calculates a current gradient;

a kick-down mode threshold module that calculates a kick-down mode threshold based on said gradient; and a kick-down mode module for establishing a kick-down mode when a depression amount of an accelerator pedal exceeds said kick-down mode threshold, wherein said kick-down mode threshold comprises a high value when a vehicle travels on an upgrade, compared to when said vehicle travels on an even road.

26. An apparatus for controlling shifting for transmission, comprising:

a gradient module that calculates a current gradient;

a kick-down mode threshold module that calculates a kick-down mode threshold based on said gradient; and a kick-down mode module for establishing a kick-down mode when a depression amount of an accelerator pedal exceeds said kick-down mode threshold, wherein said kick-down mode threshold comprises a small value when a vehicle travels on a downgrade, compared to when said vehicle travels on an even road.

* * * * *